United States Patent
Zhou et al.

(10) Patent No.: US 11,758,547 B2
(45) Date of Patent: Sep. 12, 2023

(54) DEFAULT PDSCH BEAM SELECTION

(71) Applicant: QUALCOMM Incorporated, San Diego, CA (US)

(72) Inventors: Yan Zhou, San Diego, CA (US); Tao Luo, San Diego, CA (US); Ruhua He, San Diego, CA (US); Raghu Narayan Challa, San Diego, CA (US); Yong Li, San Diego, CA (US); Parisa Cheraghi, San Diego, CA (US); Peter Gaal, San Diego, CA (US); Juan Montojo, San Diego, CA (US); Alexandros Manolakos, Escondido, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 17/028,714

(22) Filed: Sep. 22, 2020

(65) Prior Publication Data

US 2021/0105749 A1     Apr. 8, 2021

Related U.S. Application Data

(60) Provisional application No. 62/911,194, filed on Oct. 4, 2019.

(51) Int. Cl.
*H04W 72/23*     (2023.01)
*H04W 48/12*     (2009.01)
(Continued)

(52) U.S. Cl.
CPC .......... *H04W 72/23* (2023.01); *H04L 5/0053* (2013.01); *H04W 48/12* (2013.01); *H04W 76/27* (2018.02)

(58) Field of Classification Search
CPC ............... H04W 72/042; H04W 48/12; H04W 72/1289; H04W 76/27; H04L 5/0053;
(Continued)

(56) References Cited

U.S. PATENT DOCUMENTS

2019/0239212 A1*   8/2019   Wang ................ H04W 72/0413
2019/0297640 A1*   9/2019   Liou ......................... H04L 5/00
(Continued)

FOREIGN PATENT DOCUMENTS

WO     2019099659 A1     5/2019
WO     WO-2019099659 A1 *   5/2019   ............... H04B 7/02

OTHER PUBLICATIONS

International Search Report and Written Opinion—PCT/US2020/052235—ISA/EPO—dated Dec. 1, 2020.

*Primary Examiner* — Shailendra Kumar
(74) *Attorney, Agent, or Firm* — Procopio, Cory, Hargreaves & Savitch

(57) ABSTRACT

A UE determines a default beam for a physical downlink shared channel (PDSCH) that is independent of a beam for a physical downlink control channel (PDCCH). The default PDSCH beam may be determined based on information received in a medium access control-control element (MAC-CE), or a radio resource control (RRC) message, a downlink control information (DCI). The default PDSCH beam may be determined based on at least one active transmission configuration indication (TCI) state for the PDSCH.

29 Claims, 10 Drawing Sheets

(51) Int. Cl.
*H04W 76/27* (2018.01)
*H04L 5/00* (2006.01)

(58) Field of Classification Search
CPC ... H04L 5/0091; H04L 5/0094; H04L 5/0051; H04L 5/0023; H04L 5/0044; H04L 5/0007; H04L 5/005; H04L 5/0055; H04B 7/08

See application file for complete search history.

(56) References Cited

U.S. PATENT DOCUMENTS

2020/0288479 A1\* 9/2020 Xi ..................... H04W 72/042
2020/0322109 A1\* 10/2020 Yu ...................... H04L 5/0051

\* cited by examiner

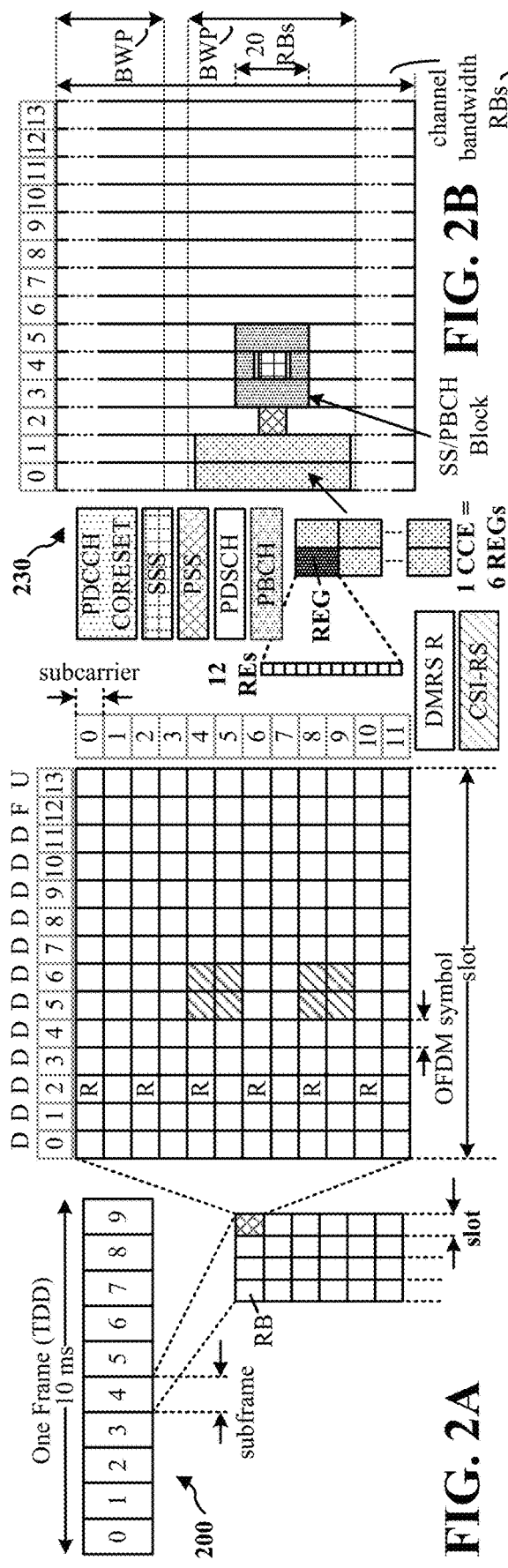
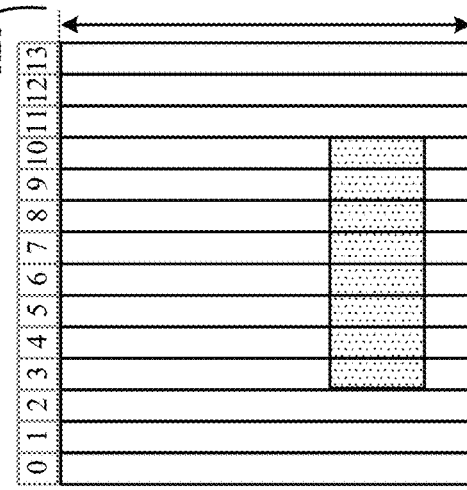
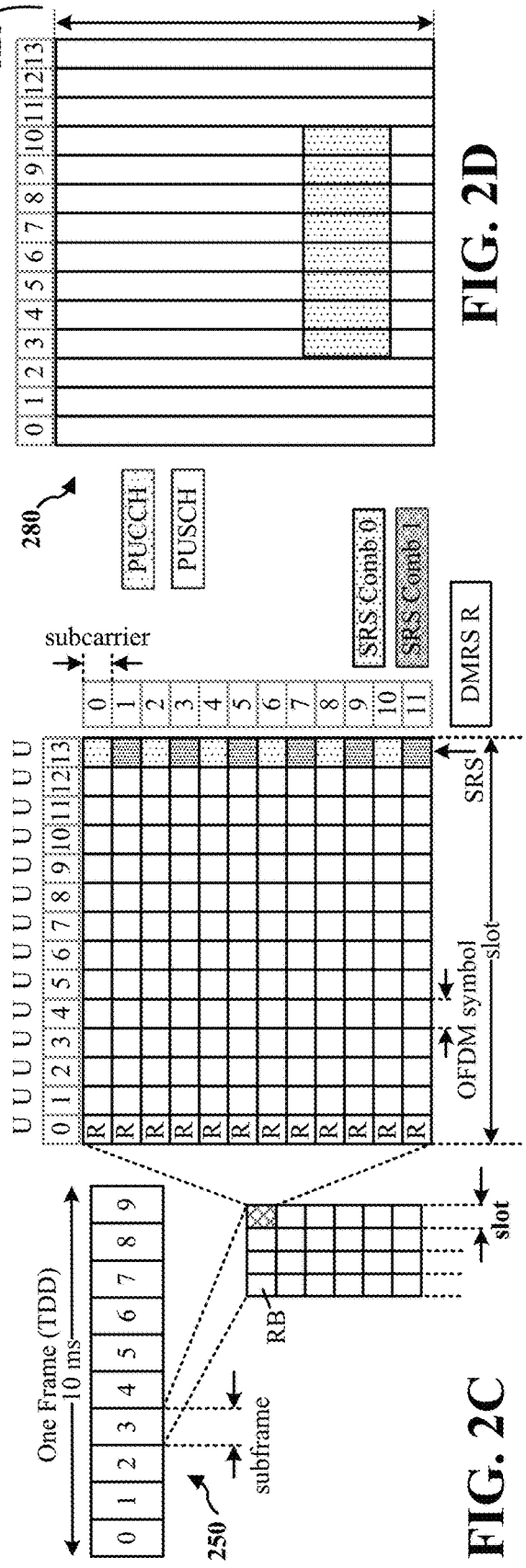
FIG. 2A  FIG. 2B  FIG. 2C  FIG. 2D

TCI States Activation/Deactivation for UE-specific PDSCH MAC-CE

| | Oct 1 | Oct 2 | Oct 3 |
|---|---|---|---|
| R | $T_7$ | $T_{15}$ | |
| Serving Cell ID | $T_6$ | $T_{14}$ | |
| | $T_5$ | $T_{13}$ | |
| | $T_4$ | $T_{12}$ | |
| | $T_3$ | $T_{11}$ | |
| | $T_2$ | $T_{10}$ | |
| BWP ID | $T_1$ | $T_9$ | |
| | $T_0$ | $T_8$ | |

Oct N

| $T_{(N-2)\times 8+7}$ | $T_{(N-2)\times 8+6}$ | $T_{(N-2)\times 8+5}$ | $T_{(N-2)\times 8+4}$ | $T_{(N-2)\times 8+3}$ | $T_{(N-2)\times 8+2}$ | $T_{(N-2)\times 8+1}$ | $T_{(N-2)\times 8}$ |

DEFAULT PDSCH BEAM SELECTION

CROSS REFERENCE TO RELATED APPLICATION(S)

This application claims the benefit of U.S. Provisional Application Ser. No. 62/911,194, entitled "Default PDSCH Beam Selection" and filed on Oct. 4, 2019, which is expressly incorporated by reference herein in its entirety.

BACKGROUND

Technical Field

The present disclosure relates generally to communication systems, and more particularly, to wireless communication including a PDSCH beam.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. In some examples, the apparatus may be a user equipment (UE). The apparatus determines a default beam for a physical downlink shared channel (PDSCH) that is independent of a beam for a physical downlink control channel (PDCCH), if information is received in a medium access control-control element (MAC-CE), a radio resource control (RRC) message, a downlink control information (DCI), or a message activating at least one transmission configuration indication (TCI) state for the PDSCH. Then, the apparatus uses the default beam to receive the PDSCH from a base station.

In an aspect of the disclosure, a method, a computer-readable medium, and an apparatus are provided for wireless communication. In some examples, the apparatus may be a base station. The apparatus receives, from a UE, an indication of a capability to determine a default beam for a PDSCH that is independent of a beam for a PDCCH. The apparatus transmits information to the UE in a MAC-CE, an RRC message, a DCI, or a message activating at least one TCI state for the PDSCH. The apparatus transmits scheduling DCI that schedules the PDSCH with a scheduling offset that is less than a threshold; and transmits the PDSCH to the UE using the default beam based on the information transmitted to the UE in the MAC-CE, the RRC message, the DCI, or the message activating the at least one TCI state for the PDSCH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 5 illustrates an example of a MAC-CE that may be used to determine a TCI state for a default PDSCH.

DETAILED DESCRIPTION

Figure 1:
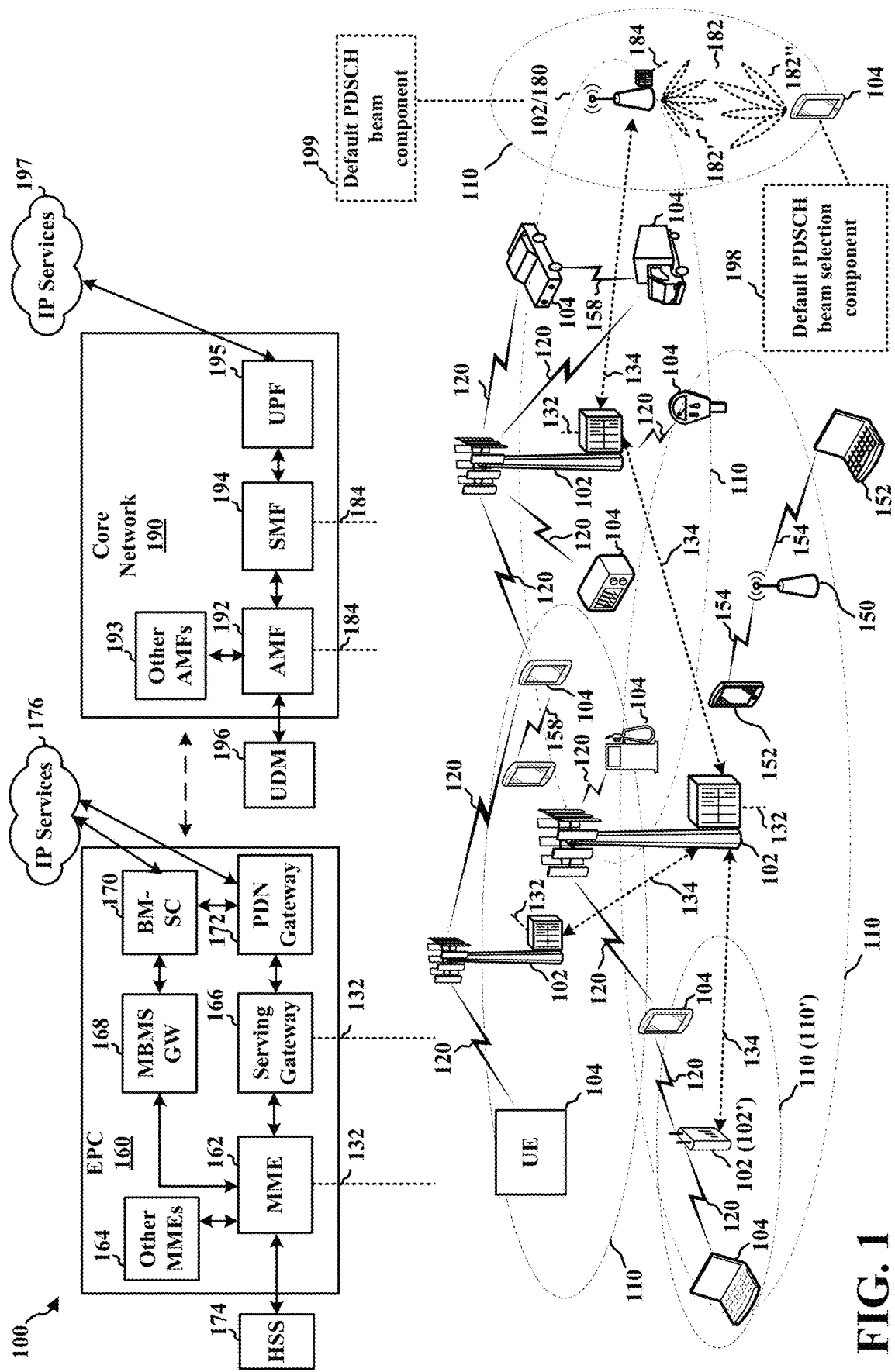
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (P SBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations 180, such as a gNB, may operate in a traditional sub 6 GHz spectrum, in millimeter wave (mmW) frequencies, and/or near mmW frequencies in communication with the UE 104. When the base station 180 operates in mmW or near mmW frequencies, the base station 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station, e.g., base station 180, may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provide s bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a default PDSCH beam component 198 configured to select a TCI state for a default PDSCH beam. The TCI state for the default PDSCH beam may be selected based on a medium access control-control element (MAC-CE). If the MAC-CE is not received, the UE may determine the default PDSCH beam using a different rule or mechanism. For example, the default PDSCH beam may be determined based on a previous rule. Alternatively, the default PDSCH beam may be determined based on a QCL of a CORESET having a lowest ID.

The default PDSCH beam may be different than any of the PDCCH beams for the UE. The default PDSCH beam may be selected based on an activated PDSCH TCI state with a lowest TCI state ID. The default PDSCH beam may be different than any of the PDCCH beams. If there is no activated PDSCH TCI state, the default PDSCH beam may be determined using a different rule or mechanism. For example, the default PDSCH beam may be determined based on a previous rule. Alternatively, the default PDSCH beam may be determined based on a QCL of a CORESET having a lowest ID.

The base station 102 or 180 may include a default PDSCH beam component 199 configured to receive, from a UE 104, an indication of a capability to determine a default beam for a PDSCH that is independent of a beam for a PDCCH. The default PDSCH beam component 199 may be configured to transmit information to the UE in a MAC-CE, an RRC message, a DCI, or a message activating at least one TCI state for the PDSCH and to transmit the PDSCH to the UE using the default beam based on the information transmitted to the UE in the MAC-CE, the RRC message, the DCI, or the message activating the at least one TCI state for the PDSCH.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
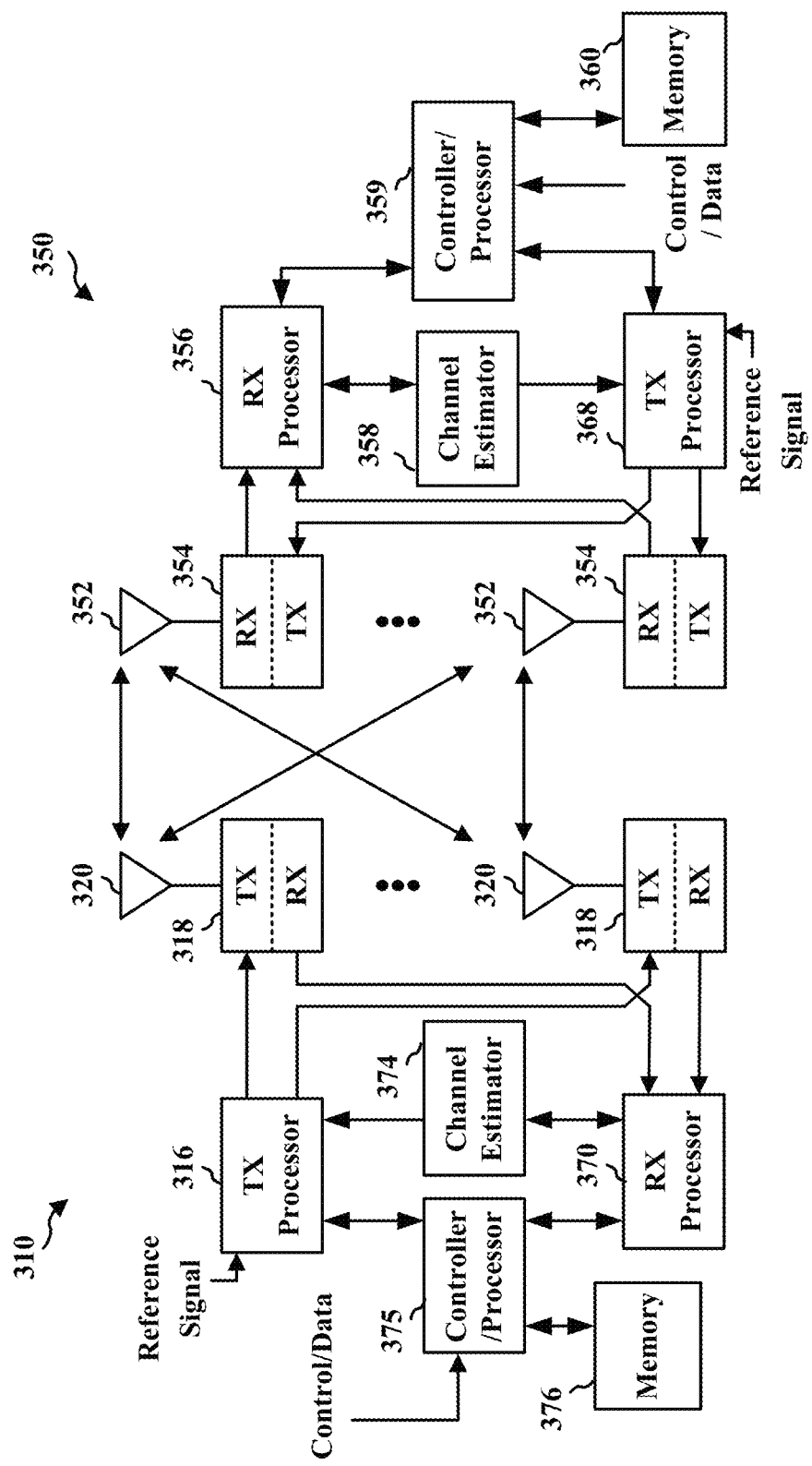
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the default PDSCH beam selection component 198 of FIG. 1.

At least one of the TX processor 316, the RX processor 370, and the controller/processor 375 may be configured to perform aspects in connection with the default PDSCH beam component 199 of FIG. 1.

Figure 4B:
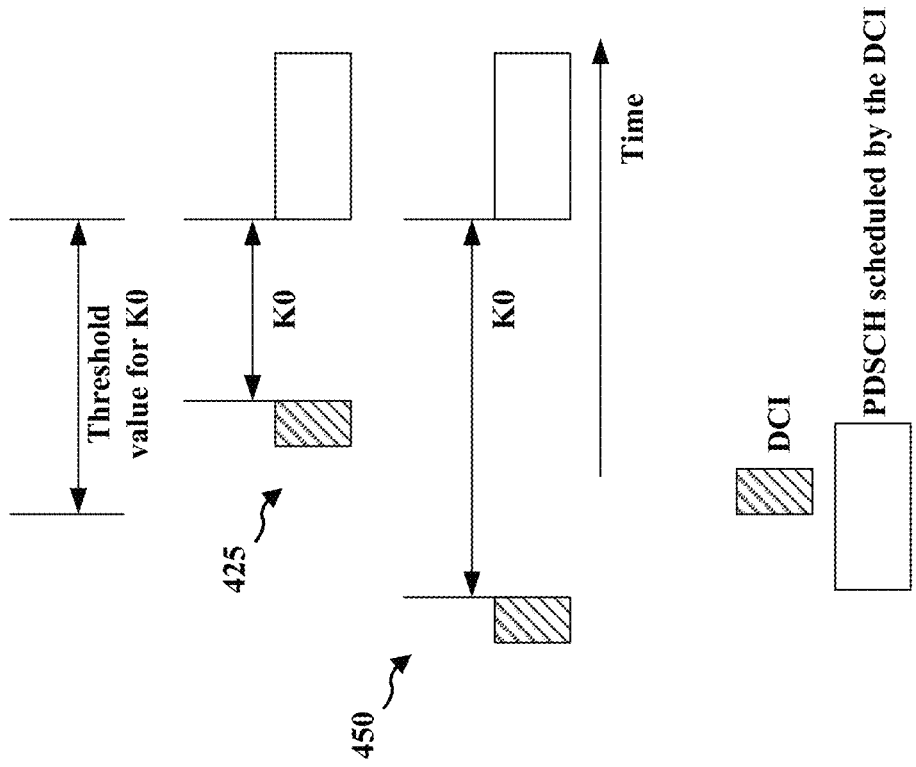
FIG. 4B illustrates an example of DCI scheduling a PDSCH transmission.
Figure 4A:
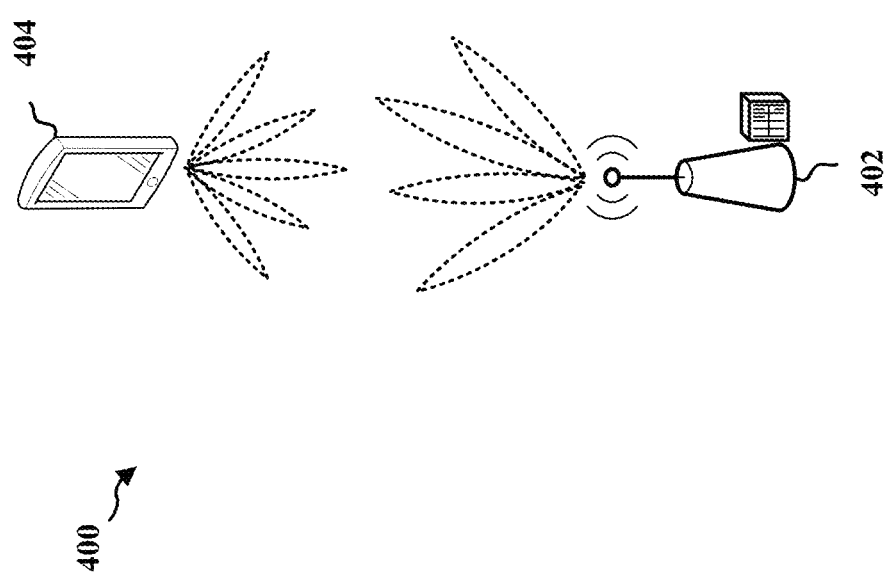
FIG. 4A illustrates an example of communication between a UE and a base station that is based on beams.

FIG. 4A illustrates an example of beamformed communication 400 between a base station 402 and a UE 404. The base station 402 and the UE 404 may each include a plurality of antennas, such as antenna elements, antenna panels, and/or antenna arrays to facilitate the beamforming. The base station 402 may transmit communication to the UE using one or more directional beams. The UE may use one or more directional beams to receive communication from the base station. Similarly, the UE 404 may transmit communication to the base station 402 using one or more directional beams, and the base station may use one or more directional beams to receive communication from the UE 404. The base station 402 or the UE 404 may perform beam training to determine the best receive and transmit directions for each of the base station 402 or UE 404. The transmit and receive directions for the base station 402 may or may not be the same. The transmit and receive directions for the UE 404 may or may not be the same.

The UE may need to determine a beam to use for receiving communication from the base station. The beam may be different for different channels. The UE may determine one or more beams for monitoring for or receiving PDCCH from the base station. The UE may determine a beam for receiving PDSCH from the base station. The base station may indicate the beam for the UE to use to receive the PDSCH from the base station. For example, the base station may indicate the beam for the UE to use in downlink control information (DCI) scheduling the PDSCH transmission for the UE. The base station may configure one or more TCI states for the UE, e.g., one or more PDSCH TCI states. Then, the base station may activate one or more of the configured PDSCH TCI states, e.g., by transmitting a MAC-CE or DCI activating the TCI state. The base station may configure one or more beams for the UE to use to monitor for PDCCH. For example, the base station may configure the UE with one or more control resource sets (CORESETs), with each CORESET configuration including beam information. Each CORESET may be associated with a CORESET identifier (ID).

There may be times when the UE does not receive an indication of the PDSCH beam in DCI and/or does not receive the DCI with enough of a scheduling offset between the scheduling DCI and the scheduled PDSCH. K0 is an offset between scheduling DCI and the scheduled PDSCH and may be indicated in terms of slots. For example, K0=0, may mean that the DCI and the scheduled PDSCH is in same slot. If K0=1, that means PDSCH is in next slot. FIG. 4B illustrates two examples of DCI scheduling PDSCH and the PDSCH transmission. In a first example 425, the scheduling offset, K0, is less than a threshold offset, and the UE may determine a default beam to receive the PDSCH. In the second example 450, the scheduling offset, K0, is greater than a threshold length of time, and the UE may have time to determine a PDSCH beam based on the DCI. The threshold length for K0 may be based on a beam switch latency time. If the scheduling offset between the scheduling DCI and the scheduled PDSCH is less than a beam switch latency threshold, the UE may determine a default PDSCH beam to use to receive PDSCH from the base station. For example, the UE may use the default PDSCH beam to receive PDSCH having K0=0, e.g., that is scheduled in the same slot as the DCI.

In other examples, the UE may not receive an indication of the PDSCH beam in the DCI, and may determine a default PDSCH beam to use to receive the PDSCH from the base station.

Thus, if the UE does not receive an indication of the PDSCH beam in the DCI, and/or the scheduling offset between the scheduling DCI and the scheduled PDSCH is less than a beam switch latency threshold, the UE may determine a default PDSCH beam for receiving the PDSCH.

The default PDSCH beam may follow QCL assumptions of a control resource set (CORESET) with a lowest CORESET ID in a latest monitored slot. To improve robustness to UE movement, wide beams can be used for transmitting/receiving PDCCH, e.g., wide beams may be used by both the base station and the UE. For example, the PDCCH beam may be wider than a beam for transmitting/receiving PDSCH. However, if the default PDSCH beam follows the PDCCH wide beam, the throughput of the PDSCH may be degraded. Table 1 shows example UE throughput results in Table 1, for a group of Cells, with multiple UEs per Cell. Table illustrates that using a level 3 narrow beams at both the UE and the base station improves a median UE throughput over using a wider (or coarser) level 2 and level 1 beams at the UE and the base station.

TABLE 1

| Base Station beam | UE beam | 5 percentile UE throughput (Mbps) | 50 percentile UE throughput (Mbps) | 95 percentile UE throughput (Mbps) |
|---|---|---|---|---|
| Level 1 | Level 1 | 0.8 | 7.2 | 34.8 |
| Level 2 | Level 2 | 2.5 | 11.4 | 49.0 |
| Level 3 | Level 3 | 4.1 | 17.5 | 54.7 |

The present disclosure provides for a UE to determine a default PDSCH beam in various ways that are independent of a PDCCH beam. Decoupling the default PDSCH beam from the PDCCH beam for the UE may enable the UE to use a default beam that is narrower than a PDCCH beam and may improve PDSCH throughput, e.g., for a configuration in which K0=0. In some examples, a UE may only support K0=0, and may repeatedly use the default PDSCH beam to receive PDSCH.

Determining the default PDSCH beam independently from the PDCCH beam may reduce data delivery latency. The reduction in data delivery latency may be helpful in applications such as for URLLC communication or industrial internet of things (IIoT) communication. Determining the default PDSCH beam independently from the PDCCH beam may improve UE power savings, such as power savings when operating using a connected mode discontinuous reception (C-DRX). The determination of a default PDSCH beam independently of a PDCCH beam, e.g., based on a CORESET configuration, may enable the UE to receive PDSCH scheduled more quickly following the scheduling DCI and with a narrower beam that provides a better throughput than a wider, PDCCH based beam. Aspects presented herein may provide greater scheduling flexibility on K0 while maintaining a sustained throughput even when a default PDSCH beam is used.

The UE 404 may select a TCI state for a default PDSCH beam. The default PDSCH beam may correspond to a beam that is used by the UE to receive PDSCH when a scheduling offset between scheduling DCI and a scheduled PDSCH is less than a beam switch latency threshold.

In some examples, the TCI state for the default PDSCH beam may be selected based on a medium access control-control element (MAC-CE). The TCI state for the default PDSCH beam, as selected based on the MAC-CE, may be different than any PDCCH beam for the UE.

If the MAC-CE is not received, the UE may determine the default PDSCH beam using a different rule or mechanism. For example, the default PDSCH beam may be determined based on a fallback rule. An example fallback rule may indicate that if the cell has one or more CORESET configured, the default PDSCH beam follows QCL assumptions of the CORESET with the lowest CORESET ID in the latest monitored slot. If the cell has no CORESET configured, the default PDSCH beam may follow the activated PDSCH TCI state with lowest TCI state ID on that cell.

Alternatively, the fallback rule may indicate that the default PDSCH beam is to be determined based on a QCL of a CORESET having a lowest CORESET ID.

As an alternative to using a MAC-CE to determine the default PDSCH beam, the UE may use information indicated by an RRC message and/or in DCI from the base station.

In some examples, the default PDSCH beam may be selected based on an activated PDSCH TCI state with a lowest TCI state ID. For example, the default PDSCH beam may be based on the activated PDSCH TCI state with the lowest TCI state ID even if a CORESET is configured for the UE. The default PDSCH beam may be different than any of the PDCCH beams for the UE. If there is no activated PDSCH TCI state, the default PDSCH beam may be determined using a different rule or mechanism. For example, the default PDSCH beam may be determined based on a fallback rule. In this example, if no PDSCH TCI state has been activated for the UE, the UE may determine the default PDSCH beam based on a QCL assumption of a CORESET having a lowest ID.

The MAC-CE that is used in the first implementation may comprise a new MAC-CE, e.g., a MAC-CE for indicating a TCI state for a default PDSCH beam. Alternatively, the MAC-CE may be based on an existing MAC-CE. FIG. 5 illustrates an example of a MAC-CE 500 that may be transmitted from the base station and used by the UE to determine a TCI state for a default PDSCH beam. The MAC-CE may comprise a control element for indicating activated PDSCH TCI states. One or more bit in the MAC-CE may indicate to the UE that a PDSCH TCI state is to be used for the default PDSCH beam. The one or more bits may be reserved bits. For example, if a reserved bit "R" in the MAC-CE in FIG. 5 is set as 1, the control element may indicate that the single indicated PDSCH TCI state is selected as the default PDSCH beam.

Figure 6:
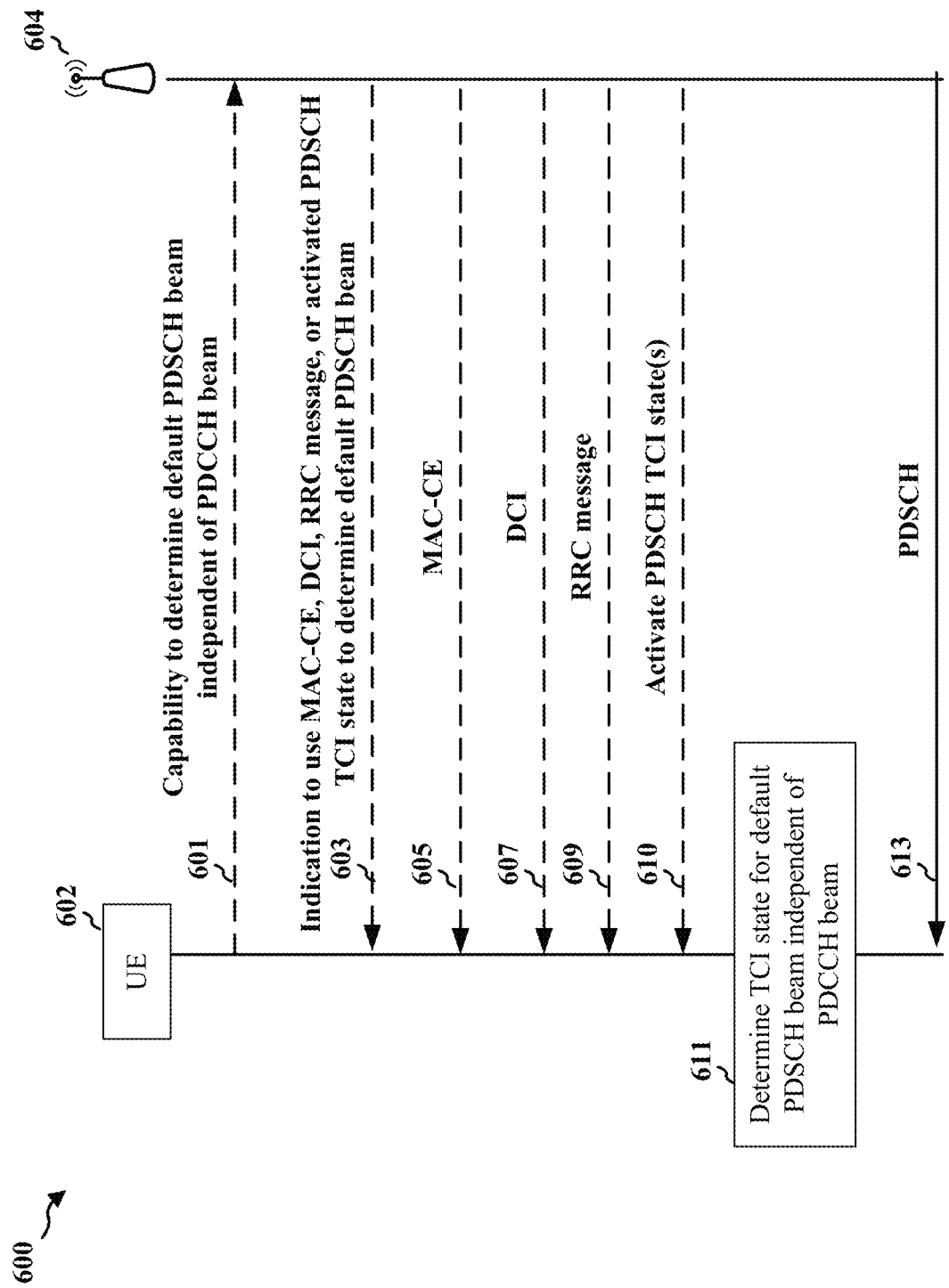
FIG. 6 illustrates an example communication flow between a UE and a base station.

FIG. 6 illustrates an example communication flow 600 between a UE 602 and a base station 604. The first and/or the second implementation may be applied when the UE 602 signals a corresponding capability, at 601, to the base station 604. The base station 604 may send an indication 603 to the UE 602 to use the implementation to determine the TCI state of a default PDSCH beam independently from a PDCCH beam, e.g., by setting a flag in an RRC message that the base station transmits to the UE. If the flag is not set in the RRC message, the UE may employ another mechanism to determine the TCI state for the default PDSCH beam.

The base station may provide an information in any of a MAC-CE 605, a DCI 607 or an RRC message 609. The UE may use the information in the MAC-CE 605 to determine, at 611, a default PDSCH beam that is different than any PDCCH beams for the UE, as described in connection with the first implementation. If the UE does not receive the information in the MAC-CE, the UE may employ a fallback rule to determine the default beam for the PDSCH. The default rule may be based on a PDCCH beam for the UE.

The UE may use the information in the DCI 607 to determine, at 611, a default PDSCH beam that is different than any PDCCH beams for the UE. If the UE does not receive the information in the DCI 607, the UE may employ a fallback rule to determine the default beam for the PDSCH. The default rule may be based on a PDCCH beam for the UE.

The UE may use the information in the RRC message 609 to determine, at 611, a default PDSCH beam that is different than any PDCCH beams for the UE. If the UE does not receive the information in the RRC message 609, the UE may employ a fallback rule to determine the default beam for the PDSCH. The default rule may be based on a PDCCH beam for the UE.

As described in connection with the second implementation, the UE 602 may receive an activation of TCI states 610 from the base station 604. The UE may determine, at 611, the default PDSCH beam based on the activated PDSCH TCI states, e.g., based on a lowest TCI state ID. If the UE does not have any activated TCI states, the UE may employ a fallback rule to determine the default beam for the PDSCH. The default rule may be based on a PDCCH beam for the UE.

After determining the default PDSCH beam, at 611, the UE may use the default PDSCH beam to receive PDSCH 613 from the base station 604.

Figure 7:
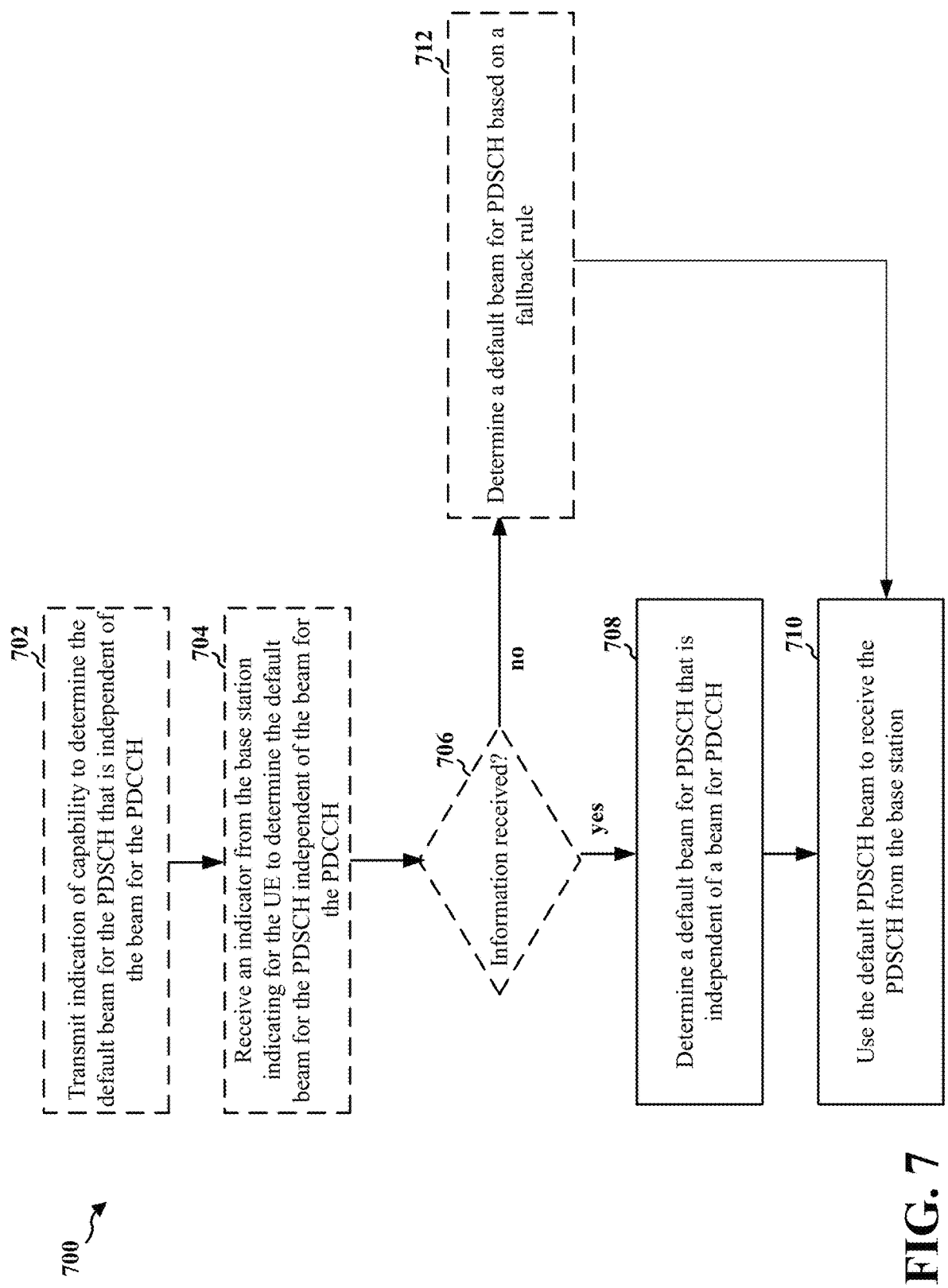
FIG. 7 is a flowchart of a method of wireless communication including the determination of a default PDSCH beam independent of a PDCCH beam.

FIG. 7 is a flowchart 700 of a method of wireless communication. The method may be performed by a UE (e.g., the UE 104, 350, 404, 602; the apparatus 802). Optional aspects are illustrated with a dashed line. The method enables the UE to determine a default PDSCH beam in a way that improves throughput on the default PDSCH beam and increases scheduling flexibility for downlink communication.

At illustrated at 702, the UE may optionally transmit an indication of a capability to determine the default beam for the PDSCH that is independent of the beam for the PDCCH. The transmission may be performed, e.g., by the capability component 840 of the communication manager 832 of the apparatus 802. FIG. 6 illustrates an example of a UE 602 providing a UE capability to the base station 604.

As illustrated at 704, the UE may optionally receive an indicator from the base station indicating for the UE to determine the default beam for the PDSCH independent of the beam for the PDCCH. The indicator may be received in RRC signaling from the base station or in a MAC-CE. The reception of the indicator may be performed, e.g., by the indicator component 842 of the communication manager 832 of the apparatus 802. FIG. 6 illustrates an example of a base station 604 providing an indication to the UE 602 to determine the default PDSCH independently of a PDCCH beam, e.g., based on the UE's capability for such a determination.

At 708, the UE determines a default beam for a PDSCH that is independent of a beam for a PDCCH, if information is received in a MAC-CE, an RRC message, a DCI, or a message activating at least one TCI state for the PDSCH. The determination may be performed, e.g., by the default beam determination component 844 of the communication manager 832 of the apparatus 802. The UE may receive the information in the MAC-CE and determine the default beam for the PDSCH that is independent of the beam for the PDCCH based on the information received in the MAC-CE. The MAC-CE may activate a PDSCH TCI state, and the UE determines the default beam for the PDSCH based on the PDSCH TCI state indicated in the MAC-CE. The UE may receive the information in the RRC message and determine the default beam for the PDSCH that is independent of the beam for the PDCCH based on the information received in the RRC message. The UE may receive UE receives the information in the DCI and determine the default beam for the PDSCH that is independent of the beam for the PDCCH based on the information received in the DCI. The UE may receive UE receives the information in the message activating the at least one TCI state for the PDSCH and determine the default beam for the PDSCH that is independent of the beam for the PDCCH based on an activated TCI state for the PDSCH having a lowest index.

The UE may determine, e.g., as illustrated at 706, whether the information is received in a MAC-CE, RRC message, DCI, or a message activating a TCI state for PDSCH. The determination may be performed by the information determination component 848 of the communication manager 832 of the apparatus 802. If the UE has received the information, the UE performs the determination of the default beam, at 708. FIG. 6 illustrates an example of a UE 602 determining a TCI state for a default PDSCH beam.

If the UE has not received the information, the UE determines the default beam for the PDSCH based on a fallback rule, at 712. The determination may be performed, e.g., by the default beam determination component 844 of the communication manager 832 of the apparatus 802. The fallback rule may include, e.g., determining the default beam for the PDSCH based on a QCL relationship to a configured CORESET having a lowest CORESET ID, e.g., in a last slot, if one or more CORESETs are configured for the UE; and determining the default beam for the PDSCH based on an activated PDSCH TCI state having a lowest TCI state ID, e.g., if a CORESET is not configured for the UE. For example, if the UE has not received an activation of a PDSCH TCI state, the UE may determine the default beam for the PDSCH based on a QCL relationship to a configured CORESET having a lowest CORESET ID, if one or more CORESETs are configured for the UE.

At 710, the UE uses the default beam to receive the PDSCH from a base station. The reception may be performed, e.g., by the PDSCH component 846 of the communication manager 832 of the apparatus 802. For example, the UE may use the default beam to receive the PDSCH from the base station if a scheduling offset between the PDSCH and a scheduling DCI that schedules the PDSCH is less than a threshold, e.g., shorter than a beam switch threshold, such as if K0=0. In some examples, the default PDSCH beam may be narrower than the PDCCH beam, e.g., a beam having a QCL relationship to a CORESET.

Figure 8:
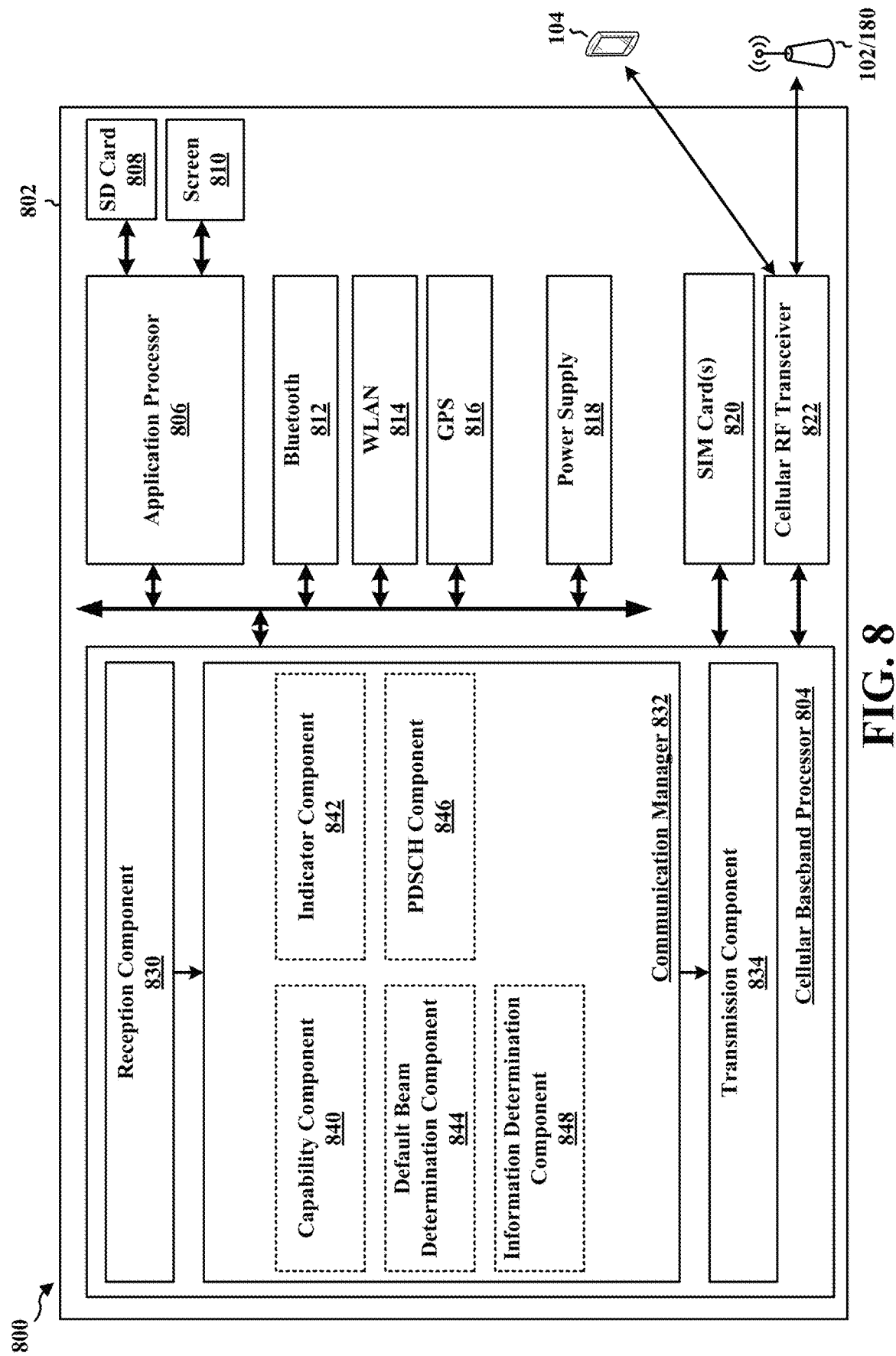
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the additional modules of the apparatus 802.

The communication manager 832 includes a capability component 840 that is configured to transmit an indication of a capability to determine the default beam for the PDSCH that is independent of the beam for the PDCCH, e.g., as described in connection with 702 in FIG. 7. The communication manager 832 further includes an indicator component 842 that is configured to receive an indicator from the base station indicating for the UE to determine the default beam for the PDSCH independent of the beam for the PDCCH, e.g., as described in connection with 704 in FIG. 7. The communication manager 832 further includes a default beam determination component 844 that is configured to determine a default beam for a PDSCH that is independent of a beam for a PDCCH, if information is received in a MAC-CE, an RRC message, a DCI, or a message activating at least one TCI state for the PDSCH, e.g., as described in connection with 708 in FIG. 7. The communication manager 832 further includes a PDSCH component 846 that is configured to use the default beam to receive the PDSCH from a base station, e.g., as described in connection with 710 in FIG. 7. The communication manager 832 further includes an information determination component 848 that is configured to determine if the information is received from the base station, e.g., as described in connection with 706 in FIG. 7.

The apparatus may include additional components that perform each of the blocks of the algorithm in the aforementioned flowchart of FIG. 7 and/or the aspects performed by the UE in FIG. 6. As such, each block in the aforementioned flowchart of FIG. 7 and/or the aspects performed by the UE in FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for determining a default beam for a PDSCH that is independent of a beam for a PDCCH, if information is received in a MAC-CE, an RRC message, a DCI, or a message activating at least one TCI state for the PDSCH and means for using the default beam to receive the PDSCH from a base station. The apparatus 802 may further include means for applying a fallback rule to determine the default beam for the PDSCH. The apparatus 802 may further include means for transmitting an indication of a capability to determine the default beam for the PDSCH that is independent of the beam for the PDCCH. The apparatus 802 may further include means for receiving an indicator from the base station indicating for the UE to determine the default beam for the PDSCH independent of the beam for the PDCCH. The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
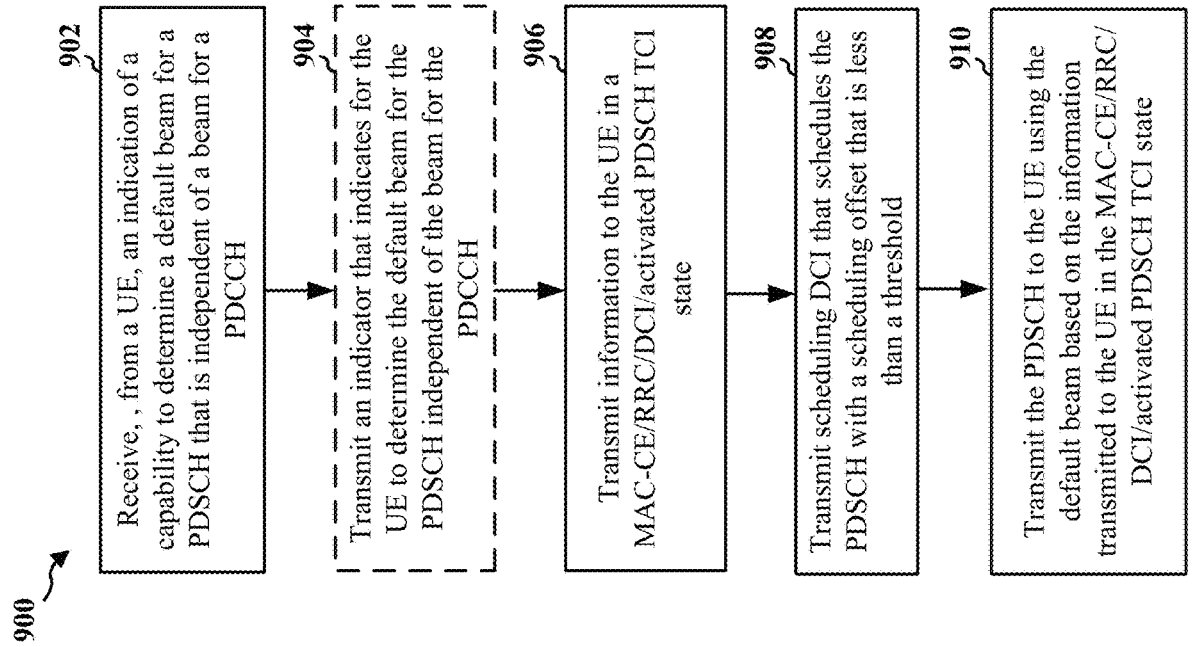
FIG. 9 is a flowchart of a method of wireless communication including using a default PDSCH beam that is independent of a PDCCH beam.

FIG. 9 is a flowchart 900 of a method of wireless communication. The method may be performed by a base station (e.g., the base station 102, 180, 310, 402, 604; the apparatus 1002. Optional aspects are illustrated with a dashed line. The method enables a base station to indicate or apply a default PDSCH beam in a way that improves throughput on the default PDSCH beam and increases scheduling flexibility for downlink communication.

At 902, the base station receives, from a UE, an indication of a capability to determine a default beam for a PDSCH that is independent of a beam for a PDCCH. The reception may be performed, e.g., by the capability component 1040 of the communication manager 1032 of the apparatus 1002. FIG. 6 illustrates an example of a UE 602 providing a UE capability to the base station 604.

At 904, the base station may optionally transmit an indicator that indicates for the UE to determine the default beam for the PDSCH independent of the beam for the PDCCH. The base station may transmit indicator to the UE in RRC signaling or a MAC-CE, for example. The transmission of the indicator may be performed, e.g., by the indicator component 1042 of the communication manager 1032 of the apparatus 1002. FIG. 6 illustrates an example of a base station 604 providing an indication to the UE 602 to determine the default PDSCH independently of a PDCCH beam, e.g., based on the UE's capability for such a determination.

At 906, the base station transmits information to the UE in a MAC-CE, an RRC message, a DCI, or a message activating at least one TCI state for the PDSCH. The base station may transmit the information in the MAC-CE. The MAC-CE may activate a PDSCH TCI state, and the default beam for the PDSCH may be based on the PDSCH TCI state indicated in the MAC-CE. The base station may transmit the information in the RRC message. The base station may transmit the information in the DCI. The base station may activate the at least one TCI state for the PDSCH and the default beam for the PDSCH may be based on an activated TCI state for the PDSCH having a lowest index. The transmission may be performed by the information component 1048 of the communication manager 1032 of the apparatus 1002. FIG. 6 illustrates various examples, e.g., 605, 607, 609, 610, of the base station 604 providing the information to the UE 602.

At 908, the base station transmits scheduling DCI that schedules the PDSCH with a scheduling offset that is less than a threshold. The transmission may be performed, e.g., by the DCI component 1044 of the communication manager 1032 of the apparatus 1002. For example, the DCI may indicate a scheduling offset between the PDSCH and a scheduling DCI that schedules the PDSCH is less than a threshold, e.g., shorter than a beam switch threshold, such as K0=0.

At 910, the base station transmits the PDSCH to the UE using the default beam based on the information transmitted to the UE in the MAC-CE, the RRC message, the DCI, or the message activating the at least one TCI state for the PDSCH. The transmission may be performed, e.g., by the PDSCH component 1046 of the communication manager 1032 of the apparatus 1002. FIG. 6 illustrates an example of the base station 604 transmitting the PDSCH based on a default PDSCH beam that is independent of a PDCCH beam. In some examples, the default PDSCH beam may be narrower than the PDCCH beam, e.g., a beam having a QCL relationship to a CORESET.

Figure 10:
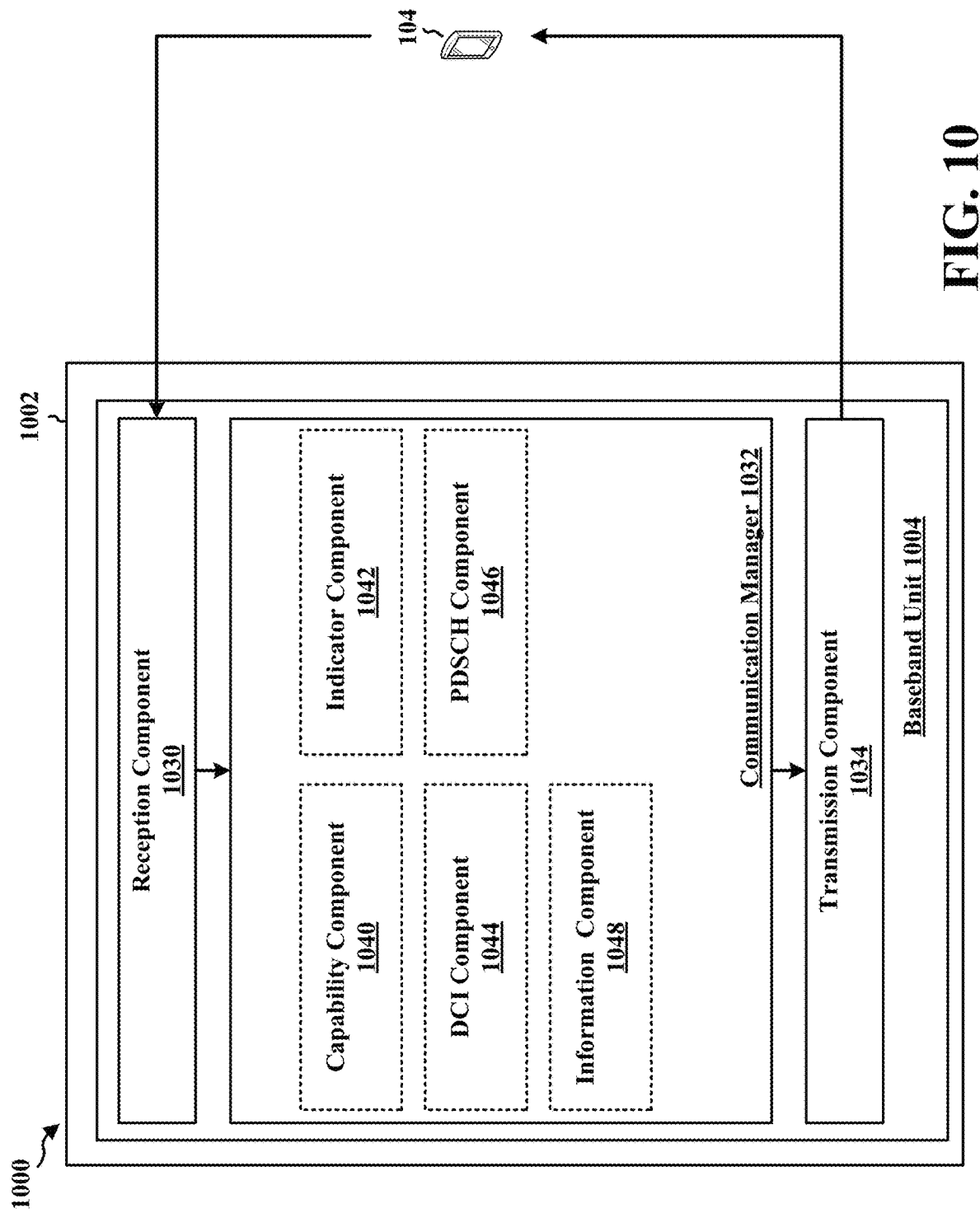
FIG. 10 is a diagram illustrating an example of a hardware implementation for an example apparatus.

FIG. 10 is a diagram 1000 illustrating an example of a hardware implementation for an apparatus 1002. The apparatus 1002 is a base station and includes a baseband unit 1004. The baseband unit 1004 may communicate through a cellular RF transceiver with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310 and may include the memory 376 and/or at least one of the TX processor 316, the RX processor 370, and the controller/processor 375.

The communication manager 1032 includes a capability component 1040 that is configured to receive an indication of a UE capability to determine the default beam for the PDSCH that is independent of the beam for the PDCCH, e.g., as described in connection with 902 in FIG. 9. The communication manager 1032 further includes an indicator component 1042 that is configured to transmit an indicator that indicates for the UE to determine the default beam for the PDSCH independent of the beam for the PDCCH, e.g., as described in connection with 904 in FIG. 9. The communication manager 1032 further includes a DCI component 1044 that is configured to transmit scheduling DCI that schedules the PDSCH with a scheduling offset that is less than a threshold, e.g., as described in connection with 908 in FIG. 9. The communication manager 1032 further includes a PDSCH component 1046 that is configured to use the default beam to transmit the PDSCH to the UE, e.g., as described in connection with 910 in FIG. 9. The communication manager 1032 further includes an information component 1048 that is configured to transmit information to the UE in a MAC-CE, RRC message, DCI, or activation of a PDSCH TCI state, e.g., as described in connection with 906 in FIG. 9.

The apparatus may include additional components that perform each of the blocks of the algorithm in the aforementioned flowchart of FIG. 9 and/or the aspects performed by the base station in FIG. 6. As such, each block in the aforementioned flowchart of FIG. 9 and/or the aspects performed by the base station in FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for receiving, from a UE, an indication of a capability to determine a default beam for a PD SCH that is independent of abeam for a PDCCH. The apparatus 1002 may include means for transmitting information to the UE in a MAC-CE, an RRC message, a DCI, or a message activating at least one TCI state for the PDSCH. The apparatus 1002 may include means for transmitting scheduling DCI scheduling the PDSCH with a scheduling offset that is less than a threshold. The apparatus 1002 may include means for transmitting the PDSCH to the UE using the default beam based on the information transmitted to the UE in the MAC-CE, the RRC message, the DCI, or the message activating the at least one TCI state for the PDSCH. The apparatus 1002 may include means for transmitting an indicator that indicates for the UE to determine the default beam for the PDSCH independent of the beam for the PDCCH. The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following examples are illustrative only and aspects thereof may be combined with aspects of other examples or teaching described herein, without limitation.

Example 1 is a method of wireless communication at a UE, comprising: determining a default beam for a PDSCH that is independent of a beam for a PDCCH, if information is received in a MAC-CE, an RRC message, a DCI, or a message activating at least one TCI state for the PDSCH; and using the default beam to receive the PDSCH from abase station.

In Example 2, the method of Example 1, further includes that the UE uses the default beam to receive the PDSCH from the base station if a scheduling offset between the PDSCH and a scheduling DCI that schedules the PDSCH is less than a threshold.

In Example 3, the method of Example 1 or Example 2 further includes that the UE receives the information in the MAC-CE and determines the default beam for the PDSCH that is independent of the beam for the PDCCH based on the information received in the MAC-CE.

In Example 4, the method of any of Examples 1-3 further includes that the MAC-CE activates a PDSCH TCI state, and the UE determines the default beam for the PDSCH based on the PDSCH TCI state indicated in the MAC-CE.

In Example 5, the method of any of Examples 1-4 further includes that the UE receives the information in the RRC message and determines the default beam for the PDSCH that is independent of the beam for the PDCCH based on the information received in the RRC message.

In Example 6, the method of any of Examples 1-5 further includes that the UE receives the information in the DCI and determines the default beam for the PDSCH that is independent of the beam for the PDCCH based on the information received in the DCI.

In Example 7, the method of any of Examples 1-6 further includes that the UE receives the information in the message activating the at least one TCI state for the PDSCH and determines the default beam for the PDSCH that is independent of the beam for the PDCCH based on an activated TCI state for the PDSCH having a lowest index.

In Example 8, the method of any of Examples 1-7 further includes that if the UE does not receive the information, the UE determines the default beam for the PDSCH based on a fallback rule.

In Example 9, the method of any of Examples 1-8 further includes that the fallback rule includes: determining the default beam for the PDSCH based on a QCL relationship to a configured CORESET having a lowest CORESET ID, if one or more CORESETs are configured for the UE; and determining the default beam for the PDSCH based on an activated PDSCH TCI state having a lowest TCI state ID.

In Example 10, the method of any of Examples 1-9 further includes that if the UE has not received an activation of a PDSCH TCI state, the UE determines the default beam for the PDSCH based on a QCL relationship to a configured CORESET having a lowest CORESET ID, if one or more CORESETs are configured for the UE.

In Example 11, the method of any of Examples 1-10 further includes transmitting an indication of a capability to determine the default beam for the PDSCH that is independent of the beam for the PDCCH.

In Example 12, the method of any of Examples 1-11 further includes receiving an indicator from the base station indicating for the UE to determine the default beam for the PDSCH independent of the beam for the PDCCH.

In Example 13, the method of any of Examples 1-12 further includes that the indicator is received in radio resource control (RRC) signaling from the base station.

Example 14 is a device including one or more processors and one or more memories in electronic communication with the one or more processors storing instructions executable by the one or more processors to cause the device to implement a method as in any of Examples 1-13.

Example 15 is a system or apparatus including means for implementing a method or realizing an apparatus as in any of Examples 1-13.

Example 16 is a non-transitory computer readable medium storing instructions executable by one or more processors to cause the one or more processors to implement a method as in any of Examples 1-13.

Example 17 is a method of wireless communication at a base station, comprising: receiving, from a UE, an indication of a capability to determine a default beam for a PDSCH that is independent of a beam for a PDCCH; transmitting information to the UE in a MAC-CE, an RRC message, a DCI, or a message activating at least one TCI state for the PDSCH; transmitting scheduling DCI that schedules the PDSCH with a scheduling offset that is less than a threshold; and transmitting the PDSCH to the UE using the default beam based on the information transmitted to the UE in the MAC-CE, the RRC message, the DCI, or the message activating the at least one TCI state for the PDSCH.

In Example 18, the method of Example 17 further includes transmitting an indicator that indicates for the UE to determine the default beam for the PDSCH independent of the beam for the PDCCH.

In Example 19, the method of Example 17 or Example 18 further includes that the base station transmits indicator to the UE in RRC signaling to the UE.

In Example 20, the method of any of Examples 17-19 further includes that the base station transmits the information in the MAC-CE.

In Example 21, the method of any of Examples 17-20 further includes that the MAC-CE activates a PDSCH TCI state, and the default beam for the PDSCH is based on the PDSCH TCI state indicated in the MAC-CE.

In Example 22, the method of any of Examples 17-21 further includes that the base station transmits the information in the RRC message.

In Example 23, the method of any of Examples 17-22 further includes that the base station transmits the information in the DCI.

In Example 24, the method of any of Examples 17-23 further includes that the base station activates the at least one TCI state for the PDSCH and the default beam for the PDSCH is based on an activated TCI state for the PDSCH having a lowest index.

Example 25 is a device including one or more processors and one or more memories in electronic communication with the one or more processors storing instructions executable by the one or more processors to cause the device to implement a method as in any of Examples 17-24.

Example 26 is a system or apparatus including means for implementing a method or realizing an apparatus as in any of Examples 17-24.

Example 27 is a non-transitory computer readable medium storing instructions executable by one or more processors to cause the one or more processors to implement a method as in any of Examples 17-24.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   transmitting an indication of a capability to determine a default beam for physical downlink shared channel (PDSCH) that is independent of a beam for a control resource set (CORESET) for a physical downlink control channel (PDCCH);

determining the default beam for the PDSCH that is independent of the beam for the CORESET for the PDCCH, based on information received in a medium access control-control element (MAC-CE), a radio resource control (RRC) message, a downlink control information (DCI), or a message activating at least one transmission configuration indication (TCI) state for the PDSCH; and using the default beam based on the information received in the MAC-CE, the RRC message, the DCI, or the message activating the at least one TCI state to receive the PDSCH from a base station in response to a determination that a scheduling offset between the PDSCH and a scheduling DCI that schedules the PDSCH is less than a threshold.

2. The method of claim 1, wherein the UE receives the information in the MAC-CE and determines the default beam for the PDSCH that is independent of the beam for the CORESET for the PDCCH based on the information received in the MAC-CE.

3. The method of claim 2, wherein the MAC-CE activates a PDSCH TCI state, and the UE determines the default beam for the PDSCH based on the PDSCH TCI state indicated in the MAC-CE.

4. The method of claim 1, wherein the UE receives the information in the RRC message and determines the default beam for the PDSCH that is independent of the beam for the CORESET for the PDCCH based on the information received in the RRC message.

5. The method of claim 1, wherein the UE receives the information in the DCI and determines the default beam for the PDSCH that is independent of the beam for the CORESET for the PDCCH based on the information received in the DCI.

6. The method of claim 1, wherein the UE receives the information in the message activating the at least one TCI state for the PDSCH and determines the default beam for the PDSCH that is independent of the beam for the CORESET for the PDCCH based on an activated TCI state for the PDSCH having a lowest index.

7. The method of claim 1, wherein if the UE does not receive the information, the UE determines the default beam for the PDSCH based on a fallback rule.

8. The method of claim 7, wherein the fallback rule includes:
determining the default beam for the PDSCH based on a quasi co-location (QCL) relationship to a configured CORESET having a lowest CORESET identifier (ID), if one or more CORESETs are configured for the UE; or
determining the default beam for the PDSCH based on an activated PDSCH TCI state having a lowest TCI state ID.

9. The method of claim 1, wherein if the UE has not received an activation of a PDSCH TCI state, the UE determines the default beam for the PDSCH based on a quasi co-location (QCL) relationship to a configured CORESET having a lowest CORESET identifier (ID), if one or more CORESETs are configured for the UE.

10. The method of claim 1, further comprising:
receiving an indicator from the base station indicating for the UE to determine the default beam for the PDSCH independent of the beam for the CORESET for the PDCCH.

11. The method of claim 10, wherein the indicator is received in radio resource control (RRC) signaling from the base station.

12. The method of claim 1, wherein the UE determines the default beam for the PDSCH that is independent of the beam for the CORESET having a lowest identifier (ID) in response to the information received in the MAC-CE, the RRC message, the DCI, or the message activating at least one TCI state for the PDSCH.

13. An apparatus for wireless communication at a user equipment (UE), comprising:
memory; and
at least one processor coupled to the memory and configured to:
transmit an indication of a capability to determine a default beam for physical downlink shared channel (PDSCH) that is independent of a beam for a control resource set (CORESET) for a physical downlink control channel (PDCCH);
determine the default beam for the PDSCH that is independent of the beam for the CORESET for the PDCCH, based on information received in a medium access control-control element (MAC-CE), a radio resource control (RRC) message, a downlink control information (DCI), or a message activating at least one transmission configuration indication (TCI) state for the PDSCH; and
use the default beam based on the information received in the MAC-CE, the RRC message, the DCI, or the message activating the at least one TCI state to receive the PDSCH from a base station in response to a determination that a scheduling offset between the PDSCH and a scheduling DCI that schedules the PDSCH is less than a threshold.

14. The apparatus of claim 13, wherein the at least one processor is configured to receive the information in the MAC-CE and determine the default beam for the PDSCH that is independent of the beam for the CORESET for the PDCCH based on the information received in the MAC-CE.

15. The apparatus of claim 13, wherein the at least one processor is configured to receive the information in the RRC message and determine the default beam for the PDSCH that is independent of the beam for the CORESET for the PDCCH based on the information received in the RRC message.

16. The apparatus of claim 13, wherein the at least one processor is configured to receive the information in the DCI and determine the default beam for the PDSCH that is independent of the beam for the CORESET for the PDCCH based on the information received in the DCI.

17. The apparatus of claim 13, wherein the at least one processor is configured to receive the information in the message activating the at least one TCI state for the PDSCH and determine the default beam for the PDSCH that is independent of the beam for the CORESET for the PDCCH based on an activated TCI state for the PDSCH having a lowest index.

18. The apparatus of claim 13, wherein if the apparatus does not receive the information, the at least one processor is configured to determine the default beam for the PDSCH based on a fallback rule that includes determining the default beam for the PDSCH based on a quasi co-location (QCL) relationship to a configured CORESET having a lowest CORESET identifier (ID), if one or more CORESETs are configured for the UE, or determining the default beam for the PDSCH based on an activated PDSCH TCI state having a lowest TCI state ID.

19. The apparatus of claim 13, wherein the at least one processor is further configured to:

receive an indicator from the base station indicating for the UE to determine the default beam for the PDSCH independent of the beam for the CORESET for the PDCCH.

20. The apparatus of claim 13, wherein the at least one processor is configured to determine the default beam for the PDSCH that is independent of the beam for the CORESET having a lowest identifier (ID) in response to the information received in the MAC-CE, the RRC message, the DCI, or the message activating at least one TCI state for the PDSCH.

21. A method of wireless communication at a base station, comprising:
receiving, from a user equipment (UE), an indication of a capability to determine a default beam for a physical downlink shared channel (PDSCH) that is independent of a beam for a control resource set (CORESET) for a physical downlink control channel (PDCCH);
transmitting information to the UE in a medium access control-control element (MAC-CE), a radio resource control (RRC) message, a downlink control information (DCI), or a message activating at least one transmission configuration indication (TCI) state for the PDSCH;
transmitting scheduling downlink control information (DCI) that schedules the PDSCH with a scheduling offset that is less than a threshold; and
transmitting the PDSCH to the UE using the default beam based on the information transmitted to the UE in the MAC-CE, the RRC message, the DCI, or the message activating the at least one TCI state for the PDSCH and based on the scheduling offset between the PDSCH and the scheduling DCI being less than the threshold.

22. The method of claim 21, further comprising:
transmitting an indicator that indicates for the UE to determine the default beam for the PDSCH independent of the beam for the CORESET for the PDCCH.

23. The method of claim 22, wherein the base station transmits the indicator to the UE in radio resource control (RRC) signaling to the UE.

24. The method of claim 21, wherein the base station transmits the information in the MAC-CE.

25. The method of claim 24, wherein the MAC-CE activates a PDSCH TCI state, and the default beam for the PDSCH is based on the PDSCH TCI state indicated in the MAC-CE.

26. The method of claim 21, wherein the base station transmits the information in the RRC message.

27. The method of claim 21, wherein the base station transmits the information in the DCI.

28. The method of claim 21, wherein the base station activates the at least one TCI state for the PDSCH and the default beam for the PDSCH is based on an activated TCI state for the PDSCH having a lowest index.

29. An apparatus for wireless communication at a base station, comprising:
memory; and
at least one processor coupled to the memory and configured to:
receive, from a user equipment (UE), an indication of a capability to determine a default beam for a physical downlink shared channel (PDSCH) that is independent of a beam for a control resource set (CORESET) for a physical downlink control channel (PDCCH);
transmit information to the UE in a medium access control-control element (MAC-CE), a radio resource control (RRC) message, a downlink control information (DCI), or a message activating at least one transmission configuration indication (TCI) state for the PDSCH;
transmit scheduling downlink control information (DCI) scheduling the PDSCH with a scheduling offset that is less than a threshold; and
transmit the PDSCH to the UE using the default beam based on the information transmitted to the UE in the MAC-CE, the RRC message, the DCI, or the message activating the at least one TCI state for the PDSCH and based on the scheduling offset between the PDSCH and the scheduling DCI being less than the threshold.

* * * * *